US009686233B2

(12) United States Patent
Paxton

(10) Patent No.: US 9,686,233 B2
(45) Date of Patent: Jun. 20, 2017

(54) TRACKING NETWORK PACKETS ACROSS TRANSLATIONAL BOUNDARIES

(71) Applicant: Napoleon C. Paxton, Woodbridge, VA (US)

(72) Inventor: Napoleon C. Paxton, Woodbridge, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 198 days.

(21) Appl. No.: 14/208,314

(22) Filed: Mar. 13, 2014

(65) Prior Publication Data
US 2014/0280778 A1     Sep. 18, 2014

Related U.S. Application Data

(60) Provisional application No. 61/778,820, filed on Mar. 13, 2013.

(51) Int. Cl.
*G06F 15/16* (2006.01)
*H04L 29/12* (2006.01)
*H04L 12/26* (2006.01)

(52) U.S. Cl.
CPC ........ *H04L 61/2585* (2013.01); *H04L 43/028* (2013.01); *H04L 43/04* (2013.01); *H04L 61/2514* (2013.01)

(58) Field of Classification Search
USPC ....................................................... 709/228
See application file for complete search history.

(56) References Cited

U.S. PATENT DOCUMENTS 7,346,770 B2 * 3/2008 Swander ............. H04L 63/0464
                                                          709/201
7,457,959 B2 * 11/2008 Margolus .......... G06F 17/30097
                                                           380/46

(Continued)

FOREIGN PATENT DOCUMENTS

WO     WO 2012154658 A2 * 11/2012 ............. G06F 21/50

OTHER PUBLICATIONS

Roedig, U., Ackerman, R., Steinmetz, R., "Evaluating and Improving Firewalls for IP-Telephony Environments," Proceedings of the 1st IP-Telephony Workshop (IPTel2000), Berlin, Germany, pp. 161-166, Jan. 2000.
Goodrich, M.T., "Efficient Packet Marking for Large-Scale IP Traceback," CCS '02 Proceedings of the 9th ACM conference on Computer and Communications Security, Washington, DC, pp. 117-126, Nov. 2002.

(Continued)

*Primary Examiner* — Alicia Baturay
(74) *Attorney, Agent, or Firm* — U.S. Naval Research Laboratory; William Ladd

(57) ABSTRACT

A method is described for calculating a first hash of a packet application layer payload at an inside sensor before a boundary, and storing a first hash data record at a device that has direct access to the inside sensor. A second hash of the packet application layer payload can be calculated at an outside sensor after the boundary, and a second hash data record can be stored at a device that has direct access to the outside sensor. The packet can be transmitted from a client to a server, or from a server to a client, and the boundary is between the client and the server. The first hash data record and second hash data record can include a hash value, an IP address, and a timestamp. Finally, a determination can be made whether the first hash data record and the second hash data record match.

19 Claims, 3 Drawing Sheets

(56) References Cited

U.S. PATENT DOCUMENTS 8,533,254 B1 * 9/2013 Whitson, Jr. ....... H04L 67/1095
709/203
8,837,483 B2 * 9/2014 Bu ..................... H04L 61/2514
370/392

OTHER PUBLICATIONS

Li, J., Sung, M., Xu, J., Li, L., "Large-scale IP traceback in high-speed Internet: practical techniques and theoretical foundation," Proceedings IEEE Symposium on Security and Privacy, Oakland, CA, pp. 115-129, May 2004.

Belenky, A., Ansari, N., IP Traceback With Deterministic Packet Marking, IEEE Communications Letters vol. 7(4), pp. 162-164, Apr. 2003.

Park, K., Lee, H., "On the Effectiveness of Probabilistic Packet Marking for IP Traceback Under Denial of Service Attack," INFOCOM 2001—Twentieth Annual Joint Conference of the IEEE Computer and Communications Societies, Anchorage, AK, pp. 338-347, Apr. 2001.

Afanasyev, A., Tilley, N., Longstaff, B., Zhang, L., "BGP routing table: Trends and challenges," in Proc. of the 12th Youth Technological Conference High Technologies and Intellectual Systems, Moscow, Russia, Apr. 2010.

Zander, S., Branch, P., Armitage, G., "Error Probability Analysis of IP Time to Live Covert Channels," IEEE Communications and Information Technologies—ISCIT '07, pp. 562-567, Oct. 2007.

* cited by examiner

TRACKING NETWORK PACKETS ACROSS TRANSLATIONAL BOUNDARIES

CROSS-REFERENCE TO RELATED APPLICATIONS

This application claims priority to provisional patent application entitled, "Tracking Network Packets Across Translational Boundaries," filed on Mar. 13, 2013, and assigned U.S. Application No. 61/778,820; the entire contents of which are hereby incorporated by reference.

FIELD OF THE INVENTION

The present disclosure relates generally to identifying network packets, and more particularly, to determining the identity of network packets as they traverse boundaries that perform Network Address Translation (NAT).

BACKGROUND

Tracking the identity of a network packet as it traverses a boundary can be difficult due to the design of an Internet Protocol (IP) network. A boundary can include routers, proxies, gateways, firewalls, and other types of computer network components. While IP calls for a source and destination address within network packets, there is no provision authenticating the origin of a packet. Further complicating matters is an Internet Engineering Task Force standard known as Network Address Translation (NAT), which can allow multiple nodes on a network to share an IP address. NAT was originally introduced as a means to continue the Internet's growth despite rapid depletion of the IPv4 address space, and its ancillary intent was to hide a network's internal topology and architecture from the world by 1) using unique, discrete address spaces for both the internal and external network segments as well as 2) mediating all inbound and outbound communications between those segments. When NAT is implemented, the source address of a packet changes from the original sender of the packet to the address of the boundary performing NAT.

NAT is typically performed on boundaries that sit in the path of communication between a client and server. Boundaries can intercept and relay the client's request to the server as well as the server's response to the client. Therefore, while client requests are sourced from the client, boundary requests alter the original client requests to appear from the boundary. Likewise, server responses are addressed to the boundary, whereas boundary responses are altered to appear addressed directly to the client. The boundary alters the source IP address, the source application ports and their associated checksums within each packet header.

Accordingly, a need remains in the art to develop a system and method to determine the identity of network packets as they traverse boundaries that perform NAT.

SUMMARY OF THE INVENTION

According to one aspect of the invention, a computer implemented method is described for calculating a first hash of an application layer payload of a packet at an inside sensor before a boundary, and storing a first hash data record from the calculated first hash at a device that has direct access to the inside sensor, or at the inside sensor. A second hash of the application layer payload of the packet can be calculated at an outside sensor after the boundary, and a second hash data record from the calculated second hash can be stored at a device that has direct access to the outside sensor, or at the outside sensor. The packets can be transmitted from a client to a server, or from a server to a client, and the boundary is between the client and the server. The first hash data record includes a hash value, an IP address, and a timestamp for the first hash of the application layer payload. The second hash data record includes a hash value, an IP address, and a timestamp for the second hash of the application layer payload. The second hash data record can be transferred to the device containing the first has data record. Finally, a determination can be made whether the first hash data record and the second hash data record match.

According to another aspect of the invention, a computer implemented system is described that includes an inside sensor module configured to calculate a first hash for each of multiple packet application layer payloads before a boundary, and store a first hash data record from the calculated first hash of the plurality of packet application layer payloads. An outside sensor module can be configured to calculate a second hash for each of the plurality of packet application layer payloads after the boundary, and store a second hash data record from the calculated second hash of the plurality of packet application layer payloads. Finally, a matching module can be configured to match individual packet application layer payloads based on the first hash data record and the second hash data record. The system can also include a client configured to transmit and receive a plurality of packets, wherein each packet contains a packet application layer payload, and a server configured to transmit and receive the plurality of packets. Additionally, the system can include a database that has direct access to the inside sensor module and outside sensor module and is configured to store the first hash data record and the second hash data record.

According to another aspect of the invention, a computer implemented method is described for calculating a first hash for each of a plurality of packet application layer payloads at a first server before a boundary, and storing a first hash data record from the calculated first hash of the plurality of packet application layer payloads on a device with access to the first server, or at the first server. A second hash can be calculated for each of the plurality of packet application layer payloads at a second server after the boundary, and a second hash data record from the calculated second hash of the plurality of packet application layer payloads can be stored on a device with access to the second server, or at the second server. Individual packet application layer payloads can then be matched based on the first hash data record and the second hash data record, which can be processed via a first-in-first-out queue based on recorded timestamps. The plurality of packets, each containing a packet application layer payload, can be transmitted from a client to a server, or from a server to a client, and the boundary can be between the client and the server. The first hash data record and second has data record can include a hash value, an IP address, and a timestamp for the first and second hash for each of a plurality of packet application layer payloads.

These and other aspects, objects, and features of the present invention will become apparent from the following detailed description of the exemplary embodiments, read in conjunction with, and reference to, the accompanying drawings.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description of the disclosure when considered in conjunction with the drawings, in which.

DETAILED DESCRIPTION OF EXEMPLARY EMBODIMENTS

Figure 1:
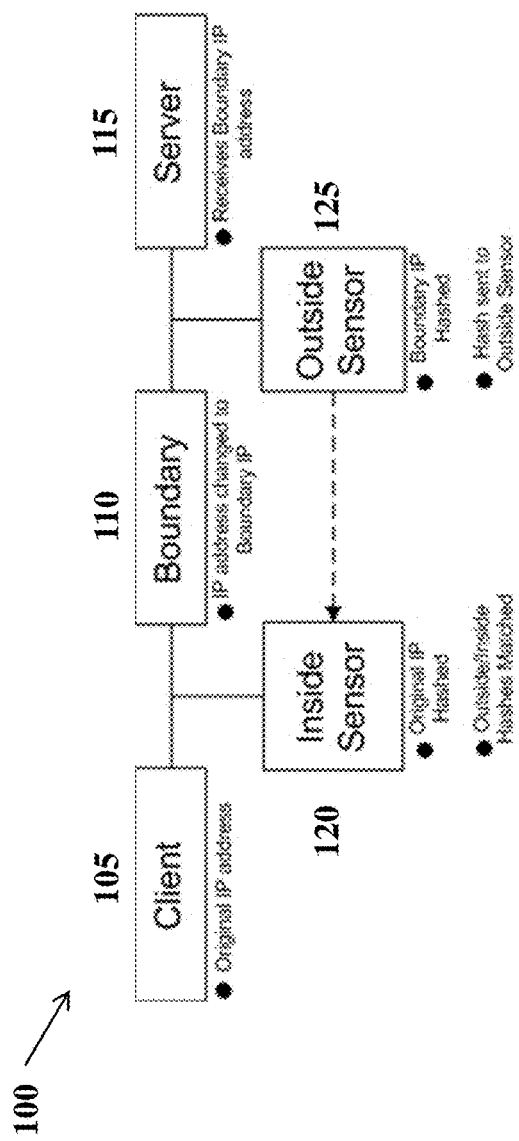
FIG. 1 is a system diagram for tracking packets across translation boundaries, in accordance with an exemplary embodiment of the invention.

One or more embodiments or implementations are hereinafter described in conjunction with the drawings, where like reference numerals refer to like elements throughout, and where the various features are not necessarily drawn to scale.

FIG. 1 is a system diagram 100 for tracking packets across translation boundaries, in accordance with an exemplary embodiment of the invention. In a similar prior art computer system, the server 115 would not know the original source of a packet it received because the source address of that packet would be changed from the client 105 to the boundary 110 when it crossed through the boundary 110. However, despite the challenge of a boundary replacing a client's network address with its own, there is a constant for the majority of packets that are transmitted: the actual message being transmitted, or the application layer payload of the packet. The application layer payload must be identical both inside and outside of the boundary 110 in order for a packet to be successfully received and interpreted by a server 115. Therefore, analyzing the application layer payload from two different perspectives, before and after the boundary 110, can be beneficial in matching an observed packet before and after it is modified by a translational boundary. Essentially, the application layer payload can be a used as an unique identifier.

As discussed herein, the exemplary system is described by referring to packets being sent from a client 105 across a boundary 110 to a server 115. However, one of ordinary skill in the art would understand that this method could be reversed without taking anything away or adding anything to the method. That is, the exemplary method could be performed when packets are being sent from a server 115 across a boundary 110 to a client 105.

In accordance with an exemplary embodiment of the invention, as a packet is transmitted from the client 105, the inside sensor 120 can calculate a hash, e.g., a MD5 algorithm hash, of the application layer payload and store it alongside network layer header. After the packet traverses the boundary 110, the outside sensor 125 can calculate a hash e.g., a MD5 algorithm hash, of the payload along with the header data of the packet.

The inside sensor 120 and outside sensor 125 can be two commodity servers running full packet capture in a promiscuous mode via a software package. While one of ordinary skill in the art would understand that a single server with two network interfaces could suffice for the inside sensor 120 and outside sensor 125, the process can implemented in a distributed fashion as described above in order to scale to the demanding requirements of full packet capture, especially on high bandwidth links. The first server, or inside sensor 120, can passively record traffic on the client 105 network before the contents are altered by a boundary. The second server, or outside sensor 125, can passively record traffic externally after it has been modified by the boundary.

As described, cryptographic hashes can be independently calculated on both sides of the boundary 110. A MD5 algorithm hash can be utilized because it is relatively easy to compute, it does not require a large memory footprint, and it produces a unique resulting value. However, one of ordinary skill in the art will understand that, in theory, any cryptographic hashing algorithm can be utilized to identify unique payloads.

The hash value from each payload can be stored in a database that has direct access to the inside sensor and outside sensor and is configured to store the first hash data record and the second hash data record along with the IP address and timestamp of when it was sensed. Alternatively, the first hash data record and the second hash data record can be stored on the inside sensor and outside sensor, respectively. This process can occur on both the inside sensor 120 and outside sensors 125. Furthermore, a separate process can mirror the contents of each sensor's database into a single instance on the inside sensor 120, or the second hash data record can be transmitted to the inside sensor. This process can be performed in order to construct a unified location for data in order to match payloads.

Payloads can be matched based on at least three criteria: hash, time, and IP address. When an identical hash is observed on the outside sensor 125 and inside sensor 120, there is a high probability that the hashes belong to the same payload. One of ordinary skill in the art will understand that it is possible that the same message can be sent multiple times across the network. In that particular case, the hash for these messages could be identical. Since the messages are the same and packets tend to be sent out of order at times, there is a small probability that a packet with a message could be hashed on one end and matched with a completely separate packet with the same payload on the other end. Since they both have the same message and are sent from the same Source IP, the fact that they are part of two separate payloads does not matter. Therefore, when an identical hash is observed on the outside sensor 125 and inside sensor 120, these hashes contain the same message and are sent from the same source.

Hashes from the inside sensor 120 and outside sensor 125 can be matched via a first-in-first-out queue based on recorded timestamps in the first hash data record and the second hash data record. A First-In-First-Out approach can be leveraged in order to match outside and inside hashes with respect to their observed timestamp. After a hash is observed on the outside, the closest matching hash (with respect to the timestamp) on the inside can be identified as the corresponding match. The combination of identifiable inside and outside header data can serve as the identity of the packet.

Figure 2:
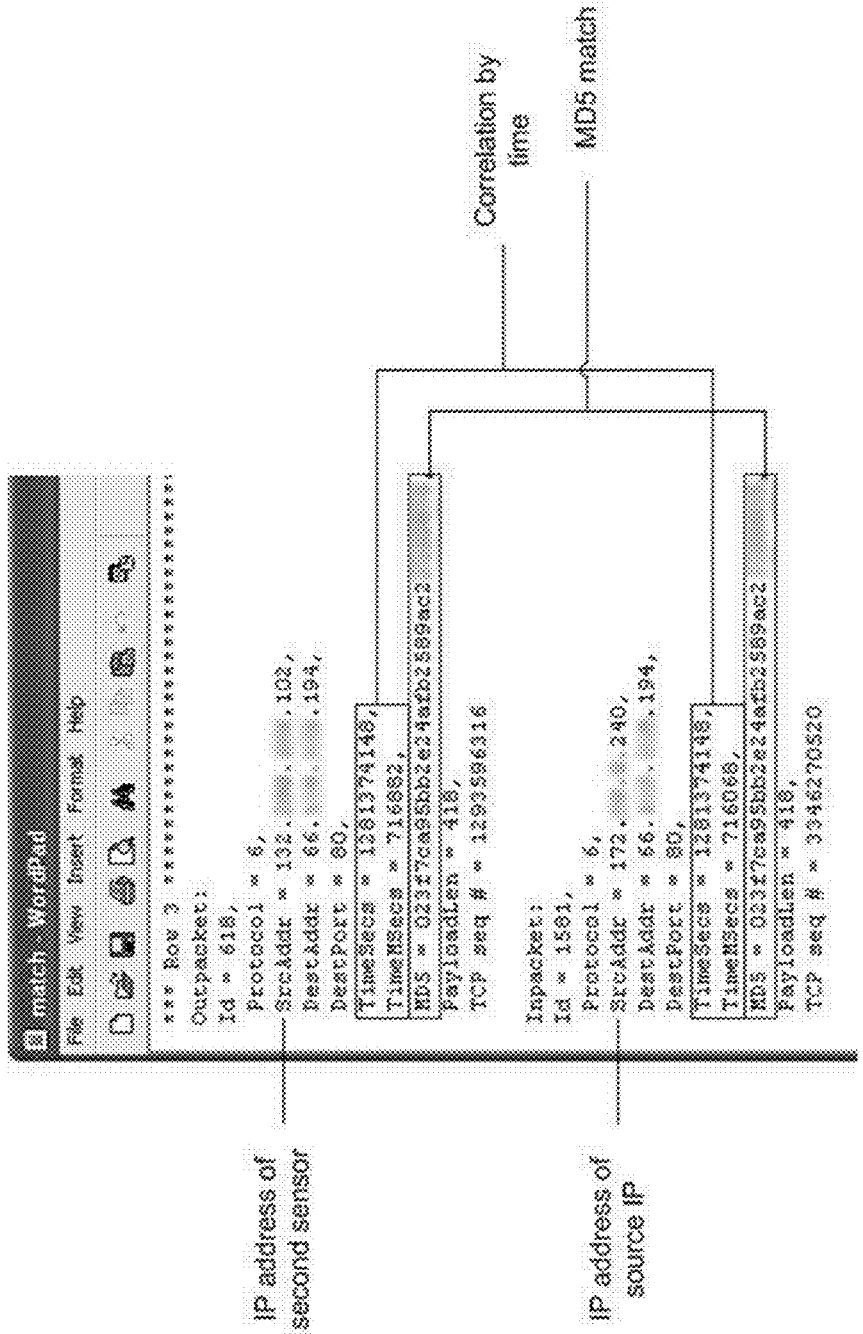
FIG. 2 is a screenshot of a log that illustrates a matching payload, in accordance with an exemplary embodiment of the invention.

FIG. 2 is a screenshot 200 of a log that illustrates a matching payload, in accordance with an exemplary embodiment of the invention. The two hashes, preceded by the MD5 label, are identical in FIG. 2. Furthermore, it is also observed that the time in TimeSecs (seconds) are equal, but the time in TimeMSecs (milliseconds) differ by 814 milliseconds. In other words, the inside packet arrived 814 milliseconds before the outside packet, which is consistent with the inside packet sensing the packet first. In this case, the identity of the packet is the SrcAddr (source address) of the packet sensed from each side, which is 132.xxx.xxx.102/ 172.xxx.xxx.240.

Figure 3:
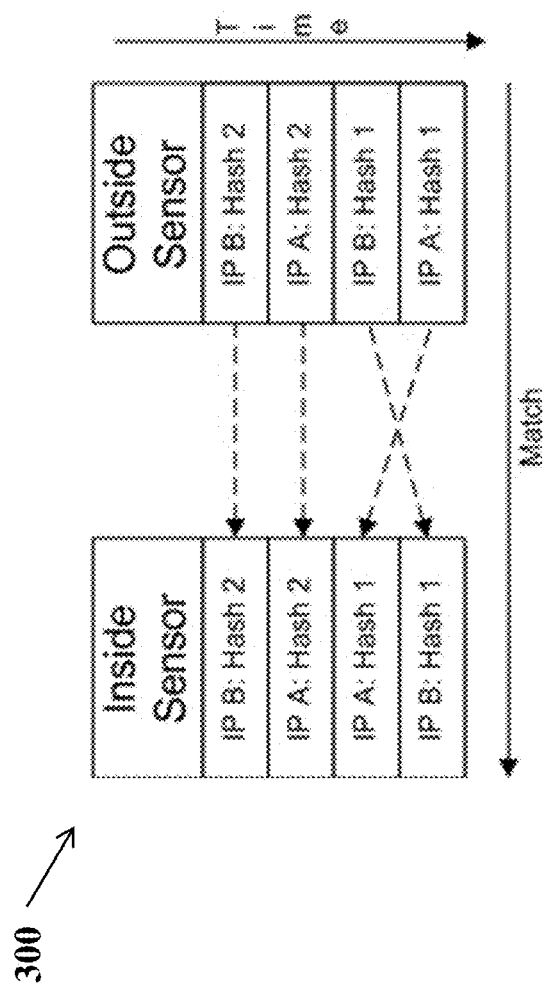
FIG. 3 is a diagram that illustrates a first-in-first-out matching approach, in accordance with an exemplary embodiment of the invention.

FIG. 3 is a diagram 300 that illustrates a first-in-first-out matching approach, in accordance with an exemplary embodiment of the invention. FIG. 3 provides an example of four packets that have been hashed by both the inside sensor 120 and outside sensor 125. In this example, there are two packets, 1 and 2, sent from both IP A and IP B for a total of four packets. FIG. 3 illustrates what happens when packets are sensed in a different order across boundaries. Here each IP, A and B, sends two messages that are the same (IPA:Hash 1 and IPA:Hash 2 are equal, and IPB:Hash 1 and IPB:Hash 2 are equal). To conduct matches, in an exemplary embodiment of the invention, the first step is to make sure the hash is equal and then the next step is to choose the equal hash that arrived first in each sensor. In this example, the initial order of which these packets were sent from the original source is IP A:Hash 1, IP A:Hash 2, IP B:Hash 1, IP B:Hash 2. However, the order of which the packets were sensed in the inside sensor 120 was IP B:Hash 2, IP A:Hash 2, IP A:Hash 1, and IP B:Hash 1. Finally, the order of which the packets were sensed at the outside sensor 125 is IP B:Hash 2, IP A:Hash 2, IP B:Hash 1, IP A:Hash 1.

Therefore, IP B:Hash 2 was the first message recorded in both the inside sensor 120 and outside sensor 125. Even though this packet has the same hash value of IP B:Hash 1, since it was sensed first on both sides, they can be matched together first. Next, IP A:Hash 2 fits the same case as IP B:Hash 2. However, the next two packets, IP A:Hash 1 and IP B: Hash 1, were sensed in a different order across the inside sensor 120 and outside sensor 125. In response, since IP A:Hash 1 and IP B:Hash 1 have different hash values, the matching module does not consider them for matching. In turn, the matching module can then find the match at the next available matching hash which was IP A:Hash 1. The matching module can then conclude with the final match IP B:Hash 1.

The system can be constructed in the C programming language, though other programming language can also be used. The data can be stored and retrieved from SQL databases, and the entire framework can be operated atop commodity hardware. One of ordinary skill in the art will understand that other system architectures can be utilized. For example, in an alternative embodiment, the inside sensor 120 and outside sensor 125 could operate on the boundary 110 as an inside sensor module and an outside sensor module as long as they still analyzed the payloads before and after the boundary functions.

In an exemplary embodiment of the invention, the system could have at least two operating modes: live packet capture and file upload. The live packet capture mode can allow a user to generate hash values from packet payloads observed on the network interface in near real-time. In the file upload mode, packet payloads can be hashed from a capture file that has been previously recorded and stored on a file system.

In the system described herein for matching cryptographically hashing payloads it is assumed that the payloads sensed both inside and outside are identical. If either payload has been altered in any way, the computed hash will not be the same and therefore will not match. For example this can occur in certain types of non-transparent proxies that can make slight modifications to the payload in order to do things such as media type transformation, protocol reduction, or anonymity filtering.

In an alternative embodiment of the invention, different classes of hashing techniques could be leveraged in order to account for slight variations in payload alterations. For example, fuzzy hashing may be able to match payloads that have been slightly altered, as in the case of non-transparent proxies or deep packet inspection platforms. Fuzzy hashing is similar to traditional cryptographic hashing; with the exception that it produces a result value that is reflective of how similar the original data is to the altered data.

The ability to identify the true source of packet transmission through a boundary can provide significant benefits to network security. Current technology that attempts to discover the identity of network packet suffers from authentication and integrity problems. It can provide a way to quickly identify nodes that are infected with malicious content, which can allow the network administrator to better identify the scope of the malicious incident. The system and method described herein can be highly modular and can be implemented atop open source technology on commodity hardware. Furthermore, it can provide a stable foundation for building tiered enterprise network architectures with an inherent capability for attribution of malicious activity. Enterprises with significant visibility and monitoring investments into the network backbone can utilize this technique to attribute malicious activity sensed at the edge of a network back to its original source.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (processor-executed processes, assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been illustrated and/or described with respect to only one of several implementations; such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

Portions of the invention can comprise a computer program that embodies the functions described herein. Furthermore, the modules described herein, such as the inside sensor module, outside sensor module, and matching module, can be implemented in a computer system that comprises instructions stored in a machine-readable medium and a processor that executes the instructions. However, it should be apparent that there could be many different ways of implementing the invention in computer programming, and the invention should not be construed as limited to any one set of computer program instructions. Further, a skilled programmer would be able to write such a computer program to implement an exemplary embodiment based on the flow charts and associated description in the application text. Therefore, disclosure of a particular set of program code instructions is not considered necessary for an adequate understanding of how to make and use the invention. The inventive functionality of the claimed computer implemented tool is explained herein in more detail read in conjunction with the figures illustrating the program flow.

It should be understood that the foregoing relates only to illustrative embodiments of the present invention, and that numerous changes may be made therein without departing from the scope and spirit of the invention as defined by the following claims.

The invention claimed is:

1. A system, comprising:
a first sensor device configured to:
sense first data from a first side of a boundary,
calculate a first hash for each of a plurality of first packet application layer payloads in the first data before the boundary, and
store a first hash data record from the calculated first hash of the plurality of packet application layer payloads; and
a second sensor device configured to:
sense second data from a second side of the boundary,
calculate a second hash for each of a plurality of second packet application layer payloads in the second data after the boundary,
store a second hash data record from the calculated second hash of the plurality of packet application layer payloads,
receive the first hash data record from the first sensor device,
match, using a fuzzy hashing method, individual packet application layer payloads in the first plurality of packet application layer payloads to corresponding individual packet application layer payloads in the second plurality of packet application layer payloads based on the first hash data record and the second hash data record,
determine, using the fuzzy hashing method, a first similar hash in the first hash data record that is approximately equal to a second similar hash in the second hash data record, and
determine, based on the matched application layer payloads, whether the first sensor device or the second sensor device has been infected with malicious content.

2. The system of claim 1, wherein the first sensor device is located within a first device located on the first side of the boundary, and wherein the second sensor device is located within a second device on the second side of the boundary.

3. The system of claim 1, wherein the first sensor device and the second sensor device are located within a device having a first network port configured to sense the first data and a second network port configured to sense the second data.

4. The system of claim 1, wherein the second sensor device is configured to match the individual packet application layer payloads based on:
the first hash data record,
the second hash data record,
a first plurality of timestamps corresponding to each respective hash in the first hash data record,
a second plurality of timestamps corresponding to each respective hash in the second hash data record,
a first plurality of Internet Protocol (IP) addresses corresponding to each respective hash in the first hash data record, and
a second plurality of IP addresses corresponding to each respective hash in the second hash data record.

5. The system of claim 4, wherein the second sensor device is configured to match the individual packet application layer payloads using:
a first First In First Out (FIFO) queue for the first hash data record, wherein the first FIFO queue is based on the first plurality of timestamps; and
a second FIFO queue for the second hash data record, wherein the second FIFO queue is ordered based on the second plurality of timestamps.

6. The system of claim 5, wherein the second sensor device is further configured to:
determine a first plurality of equal hashes in the first hash data record that are equal to a second plurality of equal hashes in the second hash data record;
determine a first equal hash in the first plurality of equal hashes that has an earliest position in the first FIFO queue;
determine a second equal hash in the second plurality of equal hashes that has an earliest position in the second FIFO queue; and
match the first equal hash to the second equal hash.

7. The system of claim 1, wherein the second sensor device is further configured to determine, using the fuzzy hashing method, an amount of similarity between the first similar hash and the second similar hash.

8. The system of claim 1, wherein the second sensor device is further configured to determine, using the fuzzy hashing method, whether a first packet application layer payload corresponding to the first similar hash or a second packet application layer payload corresponding to the second similar hash is likely to have been altered.

9. The system of claim 8, wherein the second sensor device is further configured to determine whether a first device including the first sensor or a second device including the second sensor has been infected with malicious content in response to determining that the first packet application layer payload or the second packet application layer payload is likely to have been altered.

10. A computer implemented method, comprising the steps of:
calculating, using a first sensor device, a first hash for each of a plurality of packet application layer payloads at a first server before a boundary;
storing a first hash data record from the calculated first hash of the plurality of packet application layer payloads on a device with access to the first server;
calculating, using a second sensor device, a second hash for each of the plurality of packet application layer payloads at a second server after the boundary;
storing a second hash data record from the calculated second hash of the plurality of packet application layer payloads on a device with access to the second server;
matching, using a fuzzy hashing method, individual packet application layer payloads based on the first hash data record and the second hash data record,
determining, using the fuzzy hashing method, a first similar hash in the first hash data record that is approximately equal to a second similar hash in the second hash data record; and
determine, based on the matched application layer payloads, whether the first sensor device or the second sensor device has been infected with malicious content.

11. The method of claim 10, wherein a plurality of packets, each containing a packet application layer payload, is transmitted from a client to a server, and wherein the boundary is between the client and the server.

12. The method of claim 10, wherein a plurality of packets, each containing a packet application layer payload, is transmitted from a server to a client, and wherein the boundary is between the server and the client.

13. The method of claim 10, wherein the first hash data record comprises a hash value, an IP address, and a timestamp for the first hash for each of a plurality of packet application layer payloads.

14. The method of claim 10, wherein the second hash data record comprises a hash value, an IP address, and a timestamp for the second hash for each of a plurality of packet application layer payloads.

15. The method of claim 10, wherein the step of matching individual packet application layer payloads is processed via a first-in-first-out queue based on recorded timestamps in the first hash data record and the second hash data record.

16. The method of claim 10, wherein the step of storing the first hash data record from the calculated first hash of the plurality of packet application layer payloads on the device with access to the first server, comprises storing the first hash data record at the first server.

17. The method of claim 10, wherein the step of storing the second hash data record from the calculated second hash of the plurality of packet application layer payloads on the device with access to the second server, comprises storing the second hash data record at the second server.

18. A system, comprising:
a first sensor device configured to:
  sense first data from a first side of a boundary, and
  calculate a plurality of first hashes for each of a plurality of first packet application layer payloads in the first data, and
a second sensor device configured to:
  sense second data from a second side of the boundary,
  calculate a plurality of second hashes for each of a second plurality of packet application layer payloads in the second data,
  receive, from the first sensor:
    the plurality of first hashes, and
    a first plurality of timestamps corresponding to each respective hash in the first plurality of hashes,
  match, using a fuzzy hashing method, individual packet application layer payloads in the first plurality of packet application layer payloads to corresponding individual packet application layer payloads in the second plurality of packet application layer payloads based on the plurality of first hashes, the first plurality of timestamps, the plurality of second hashes, and a second plurality of timestamps corresponding to each respective hash in the second plurality of hashes, thereby forming a plurality of matched individual packet application layer payloads, and
  identify, based on the plurality of matched individual packet application layer payloads and a plurality of Internet Protocol (IP) addresses corresponding to the plurality of matched individual packet application layer payloads, a respective source device for each of the second plurality of packet application layer payloads, wherein each respective identified source device transmitted each respective packet application layer payload in the second plurality of packet application layer payloads across the boundary.

19. The system of claim 18, wherein the second sensor device is further configured to:
determine, based on the plurality of matched individual packet application layer payloads, whether the first sensor device or the second sensor device has been infected with malicious content.

* * * * *